United States Patent
Lodi et al.

(10) Patent No.: US 7,481,442 B2
(45) Date of Patent: Jan. 27, 2009

(54) ORIENTABLE SUPPORT FOR THE MUDGUARD OF A STEERED WHEEL OF AN OPERATING MACHINERY, SUCH AS A TRACTOR

(75) Inventors: Enzo Lodi, Fabbrico (IT); Elios Lodi, Fabbrico (IT); Luigi Lodi, Fabbrico (IT)

(73) Assignee: Lodi Luigi e Figli S.r.l., Fabbrico (Reggio Emilia) (IT)

( * ) Notice: Subject to any disclaimer, the term of this patent is extended or adjusted under 35 U.S.C. 154(b) by 424 days.

(21) Appl. No.: 11/441,357

(22) Filed: May 26, 2006

(65) Prior Publication Data

US 2007/0273122 A1 Nov. 29, 2007

(51) Int. Cl.
*B62B 9/17* (2006.01)

(52) U.S. Cl. .................. 280/154; 280/848; 280/155; 280/851

(58) Field of Classification Search ........... 280/154, 280/848, 155, 851
See application file for complete search history.

(56) References Cited

U.S. PATENT DOCUMENTS 3,700,260 A * 10/1972 Moore et al. ............... 280/851
5,967,553 A * 10/1999 Cominsky .................. 280/847
6,446,900 B1 * 9/2002 Syska et al. ................ 242/403

FOREIGN PATENT DOCUMENTS

IT    MI 98400519    3/1998

* cited by examiner

*Primary Examiner*—Christopher Ellis
*Assistant Examiner*—Cynthia F. Collado
(74) *Attorney, Agent, or Firm*—Browdy and Neimark, P.L.L.C.

(57) ABSTRACT

Mudguard support for self-propelled operating machinery mounted on wheels, comprising a first element (2) intended to be fixed on the hub (11) of a steered wheel of the machinery, and a second element (3) which is articulated to the preceding along a substantially vertical axis (4), and is set to support the mudguard of said wheel, where between said first (2) and second (3) elements a repositioning system is interposed adapted to constantly force the mentioned elements towards a neutral configuration wherein the mudguard is found in the normal covering position of the wheel, and where a counter means is foreseen adapted to hold said second element at the time of particularly sharp turns in the direction wherein the position plane of the wheel diverges from the axis of the machinery in the movement direction, a further counter means being foreseen adapted to hold said second element at the time of particularly sharp turns in the direction wherein the position plane of the wheel converges towards the axis of the machinery in the movement direction, said repositioning system comprising an elastic member (25) which is structured and connected to said first and second elements so to hold the second element in a central position when the wheel does not exceed a specific steering angle.

12 Claims, 4 Drawing Sheets

ORIENTABLE SUPPORT FOR THE MUDGUARD OF A STEERED WHEEL OF AN OPERATING MACHINERY, SUCH AS A TRACTOR

The present invention refers, in an entirely general sense, to the operating machinery mounted on wheels, and more in particular it pertains to the farm tractors. More specifically, the finding regards improvements brought to the orientable mudguard holder support according to the patent application No. MI98A000519 by the same Applicant.

The support described in said document, whose text should be referenced for further information, has the function of permitting the tractor to operate with the maximum steering angle, without the mudguard interfering with the tractor structure.

It comprises a first element intended to be fixed on the hub of a steered wheel of a tractor, and a second element which is articulated to the preceding along a substantially vertical axis, and is set to support the mudguard of said wheel.

Between said first and second element a repositioning system is interposed which is set to constantly force the two mentioned elements towards a neutral configuration wherein the mudguard is in the normal covering position of the wheel, or rather is oriented in the movement direction of the latter.

In particular, said repositioning system comprises a preloaded traction spring which is placed on the side and transversally to the articulation axis of the two elements, to which it is connected with its own terminal portions.

Moreover, between the second element and the front axle of the tractor, unilateral countering means are interposed which are adapted to limit the rotation of said second element, and therefore the rotation of the respective mudguard, in order to prevent the latter from interfering with the tractor structure.

Due to the above mentioned known support, when the tractor travels straight ahead or follows relatively wide curves, or rather subtending steering angles less than the limit value at which the mudguard would interfere with the tractor structure, the two elements of the support act as a single piece, i.e. they rotate together following the movements of the hub.

When instead the steering angle exceeds said limit value and moves towards the maximum steering value, then the second element, and thus also the mudguard, is held by said counter means, while the first element continues to rotate together with the hub.

Then, when the steering angle returns within said limit value, there is the automatic realignment of the wheel and of the mudguard by the repositioning system.

For other structural and functional details of the support outlined above, please refer to the abovementioned document.

One problem which affects the mentioned known support lies in the fact that it is of unidirectional or unilateral type, i.e. it is adapted to limit the oscillations of the mudguard in only one steering direction.

For example, it stops the rotation of the right mudguard during sharp turns towards the right, and that of the left mudguard during sharp turns to the left. Consequently, it is absolutely necessary to appropriately shape and/or size the mudguard, in particular its front part in the exemplified case, to ensure that it does not interfere with the vehicle during sharp turns in the opposite direction to that specified above.

This implies a consistent shortening of the mudguard, which inconveniently leaves the antero-superior zone of the underlying tyre uncovered, with the result that soil and debris collected from the ground is hurled upward during movement.

Moreover, the prevision of said traction spring placed on the side of the articulation axis of the two elements renders the support complex and cumbersome, and inconveniently leaves the seat of said spring exposed, with the clear possibility of depositing extraneous material which could cause a malfunctioning of the entire repositioning system.

The object of the present finding is that of making available an orientable mudguard holder support capable of overcoming the problems mentioned above in the context of a simple, rational, reliable, robust and economical structural solution, also of limited size and adapted to practically insulate its operating members from the outside environment.

Said object is carried out due to the means indicated in the principal claim.

In particular, the support in accordance with the finding is equipped with a bilateral repositioning system, i.e. adapted to block interferences between mudguard and vehicle in both steering directions, which is particularly convenient since it permits associating the wheel with a complete mudguard, or rather one which is capable of covering the entire zone above the wheel. Preferred embodiments of the means set out for such purpose are outlined in the dependent claims.

The structural characteristics and merits of the finding, as well as its operating modes, will be evident from the following detailed description, made with reference to the figures of the attached drawing tables which illustrate a particular, preferred embodiment as merely exemplifying and not limiting.

Figure 1:
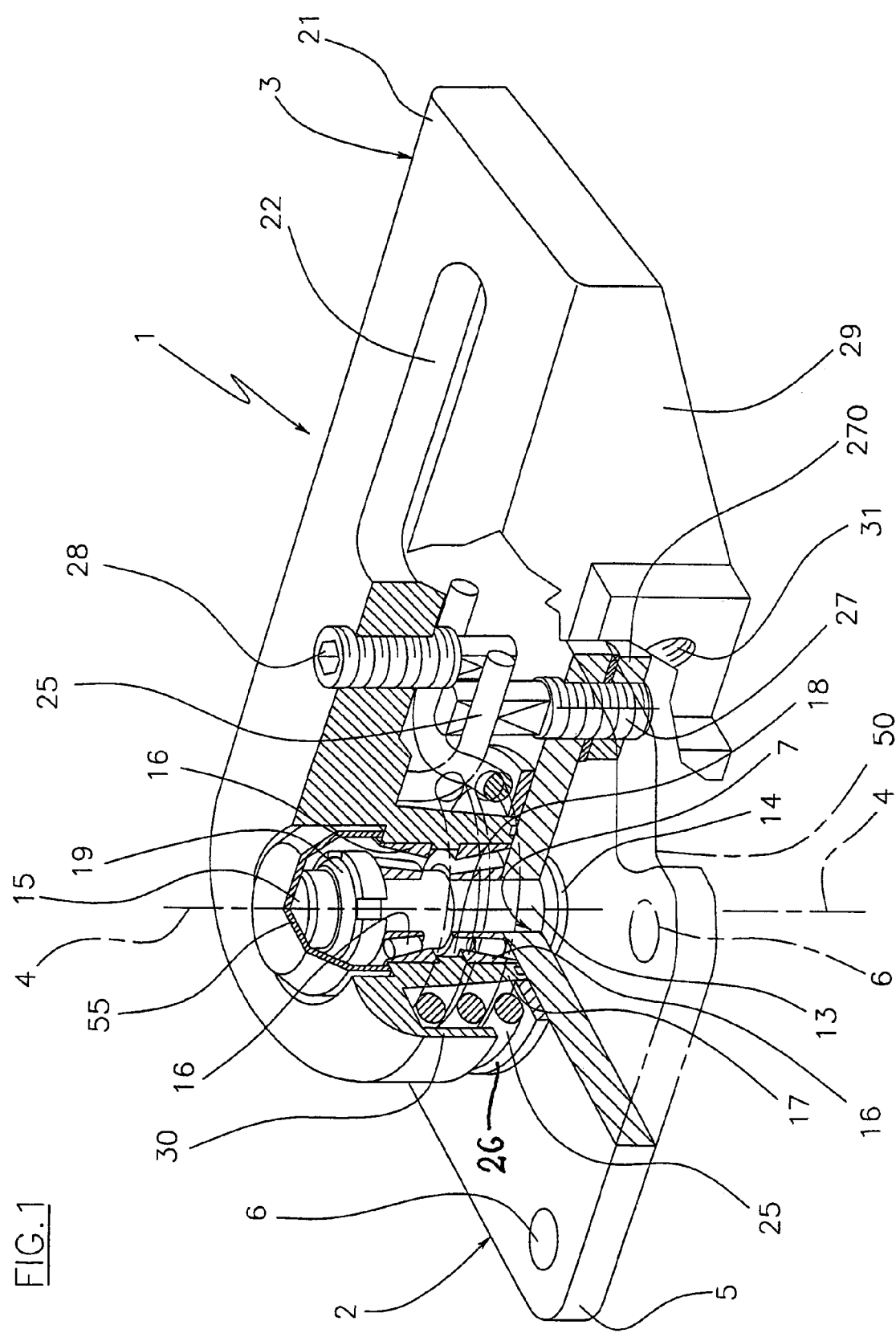
FIG. 1 shows the support according to a lateral perspective view with split sections.

Firstly, it is specified that express reference will be made below to the front left steered wheel of an agricultural vehicle, it being understood that that said will likewise apply to the opposite right wheel.

It is also specified that the support in accordance with the finding is typically adapted for farm tractors, but obviously nothing prohibits adopting it for any self-propelled operating machinery mounted on wheels.

The support, overall referred to with the reference number 1, is intended to be associated with a front steered wheel 12 (see FIG. 4) of a tractor, the latter not illustrated for the sake of simplicity.

The support 1 overall comprises a first 2 and a second 3 element which are mutually articulated along an axis indicated with 4.

The element 2 comprises a plate 5 which has a peripheral series of identical through holes 6 (4 of them in FIG. 2), and an additional central through hole 7 (see FIGS. 1 and 3) of greater diameter.

Figure 3:
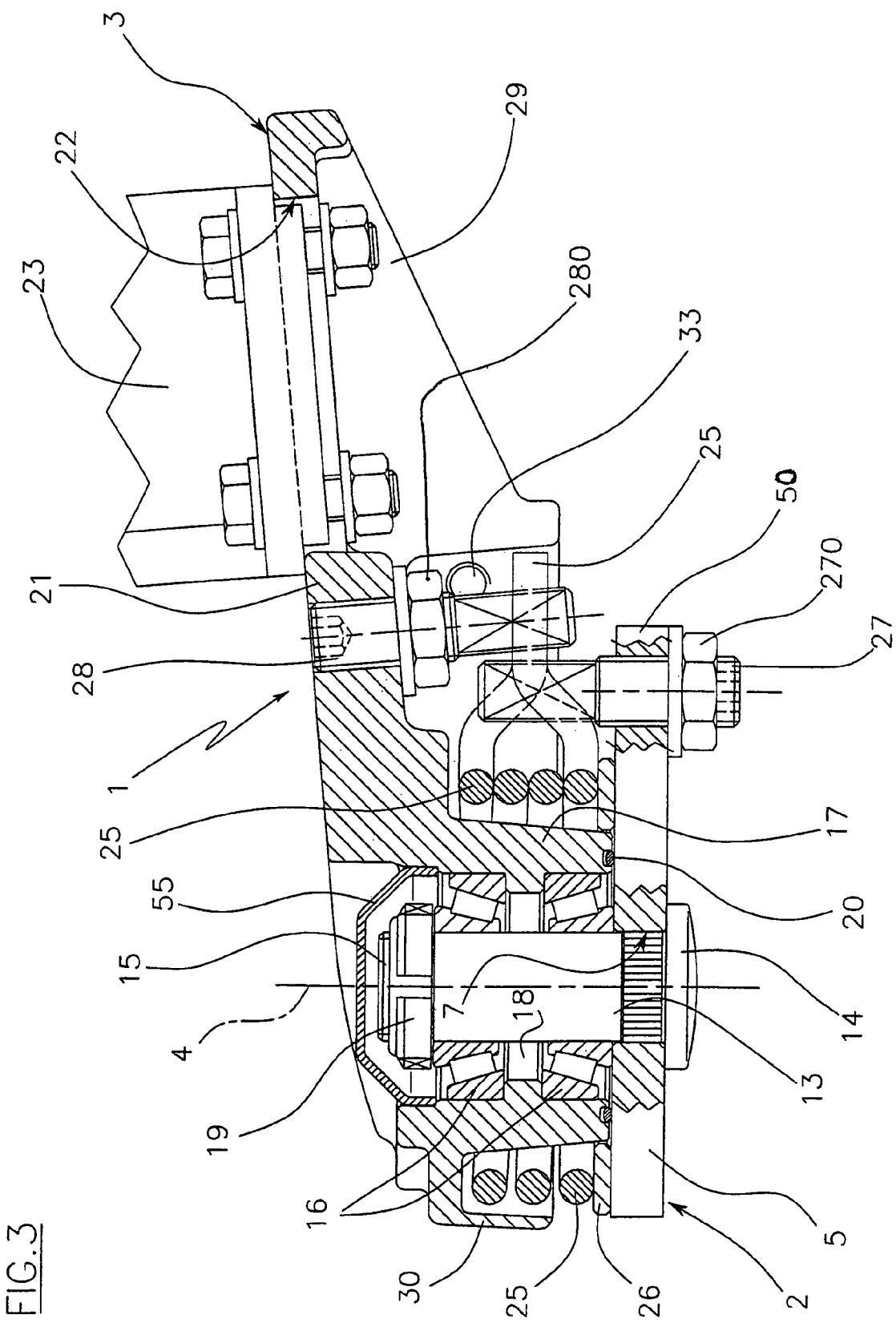
FIG. 3 is the III-III section marked in FIG. 2.

The same plate 5 is provided with a lateral appendage 50 crossed by a threaded hole (FIGS. 1 and 3).

Figure 4:
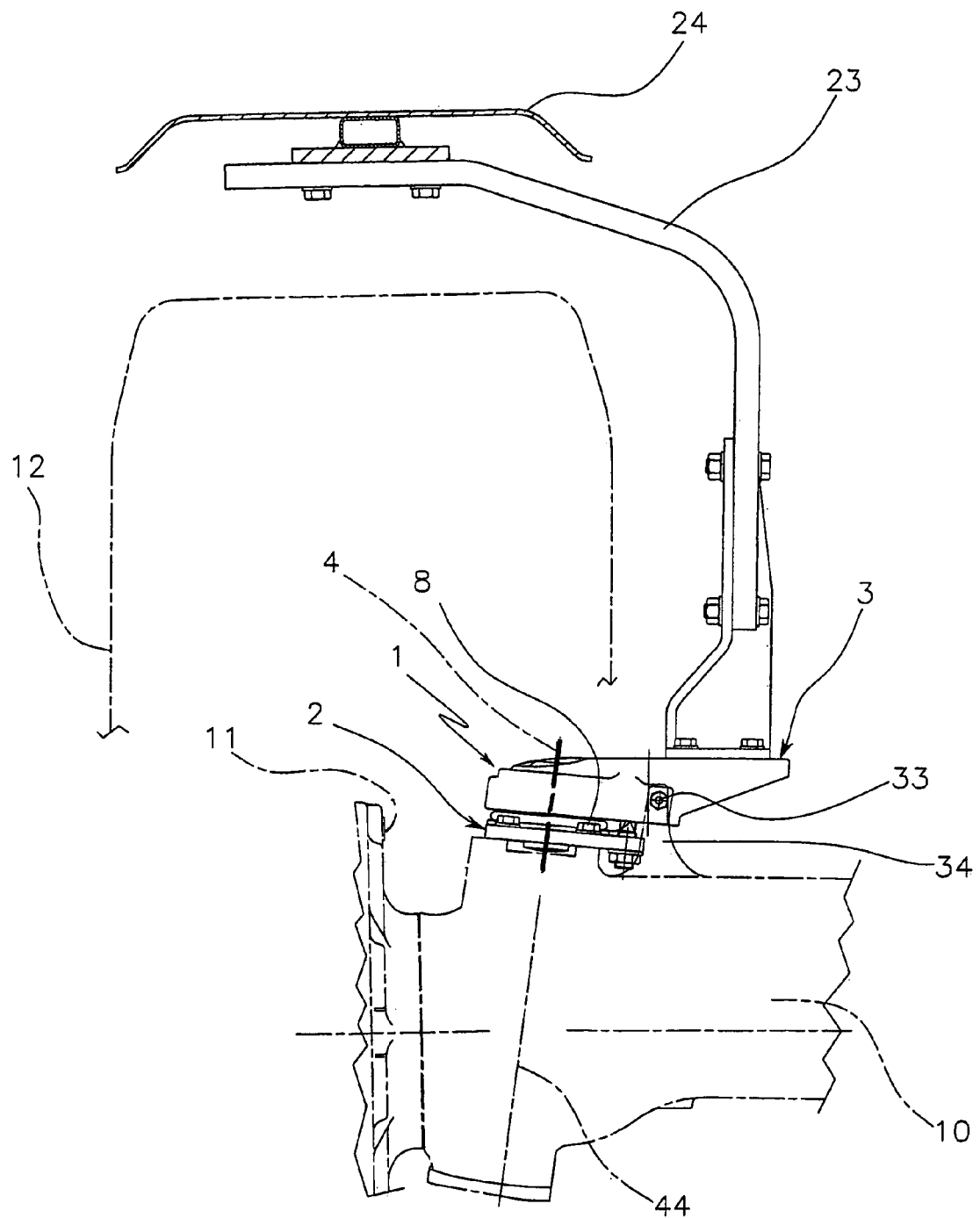
FIG. 4 is a rear schematic view of the front left wheel of an agricultural vehicle which is equipped with a support in accordance with the finding.

Due to said peripheral holes 6, the plate 5 can be bound, by means of appropriate threaded means such as the screws 8, shown in FIG. 4, at the top of the front (left) hub 11 of the axle 10 of the tractor.

The respective (left) wheel 12 is connected to said hub 11, and the same hub 11 is pivoted to the axle 10 along the tilted axis indicated with 44, which naturally constitutes the steering axis of the wheel 12.

Obviously said steering is placed under the control of an adequate steering group, of known type and for the sake of simplicity not shown.

As is well-illustrated in FIG. 4, the articulation axis 4 of the support 1 and the steering axis 44 of the hub 11 are advantageously coinciding, which places the support 1 in the best functioning and efficiency conditions.

In the central hole 7 of the plate 5, a pivot 13 is inserted from below and is therein locked by means of forced coupling. The pin 13 has an enlarged abutment head 14 below, and a threaded section 15 above (see FIG. 3).

The inner rings of two conical bearings 16 are inserted on the pivot 13; the outer rings of the bearings 16 are coupled with respective seats made inside a bush 17, and are separated by a circumferential indented bracket 18.

All of the above are pack-tightened by a ring nut 19 inserted at the top 15 of the pivot 13; the ring nut 19 is concealed by a cap 55, pressure-inserted in the upper mouth of the bush 17, and between the base of the bush 17 and the plate 5 there is a seal gasket 20 (FIG. 3).

On the part turned towards the side of the tractor (to the right in FIG. 4), the bush 17 has a bracket 21 of elongated shape which has a central longitudinal slit 22, and which fixes (see FIG. 3) a normal support frame 23 of the mudguard 24 (see FIG. 4).

It is specified that said mudguard 24 is of complete type, i.e. adapted to enclose the entire upper part of the wheel 12 when it is found in a normal or neutral position.

The use of said complete mudguard is made possible by means described below, which as shall be seen are adapted to avoid interferences between the mudguard and tractor structure when very sharp curves are carried out either to the right or the left.

Said means comprise a cylindrical torsion spring 25 which encloses the bush 17 with a certain clearance, and which finds support on the plate 5 with the interposition of a washer 26. The head and end terminal portions of the spring 25 are respectively connected to the plate 5 and the bracket 21 (FIGS. 1-3).

Figure 2:
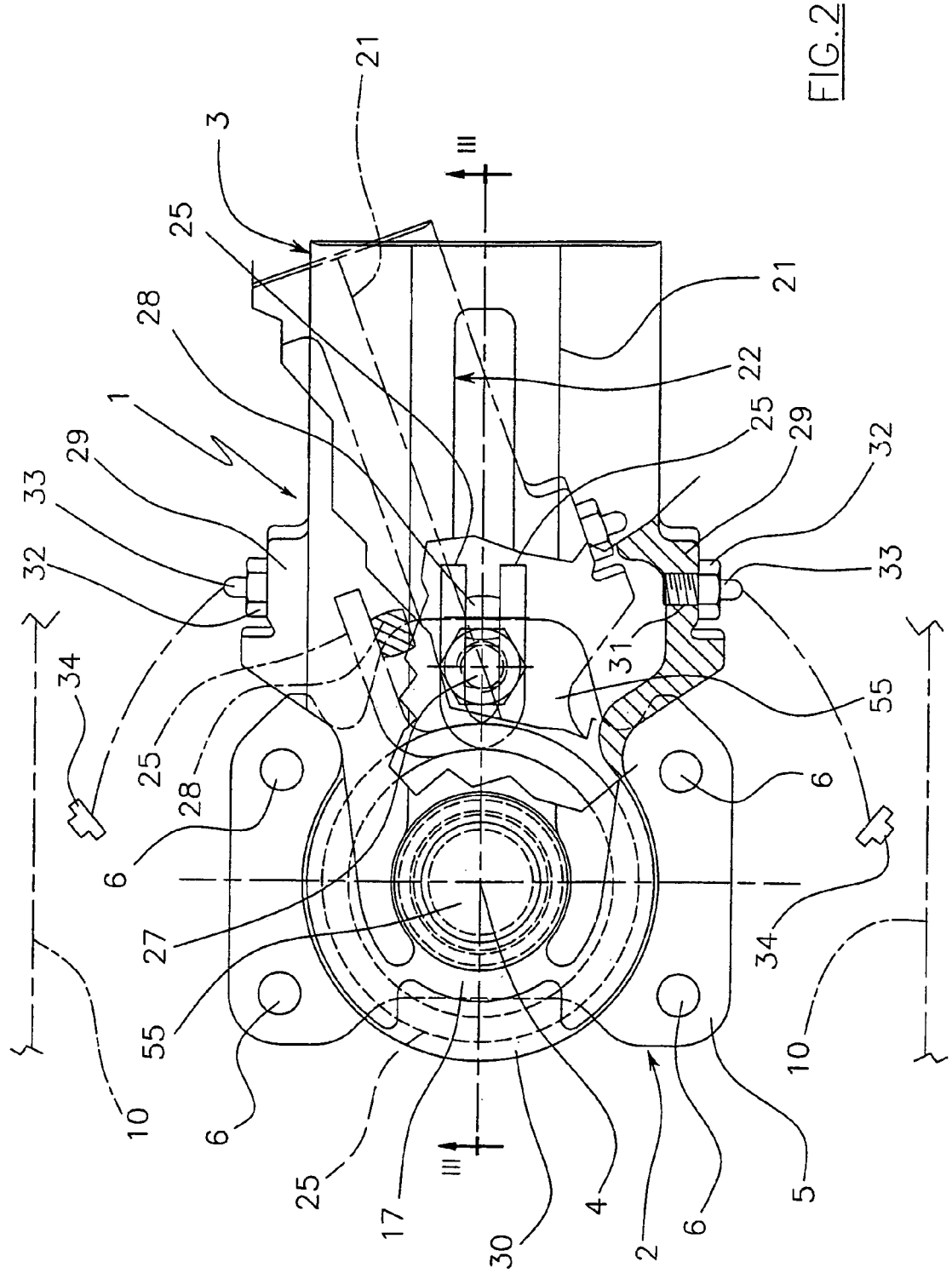
FIG. 2 is the plan view with split sections of FIG. 1.

In particular, said terminal portions are overlapped and cross each other like scissors, and with their free ends make available an opening with parallel sides (see FIGS. 1 and 2).

Inside said opening, a projecting pin 27 is inserted from below which is screwed below in the threaded hole of the appendage 50 of the plate 5, and therein locked by an adjusting and locking nut 270 (FIG. 3). Said pin 27 acts as an anti-rotation member for the spring 25. In the same opening, a second pin 28 is inserted this time from above, which is screwed above in a respective threaded hole of the bracket 21, and therein locked by an adjusting and locking nut 280.

In the neutral configuration illustrated in FIG. 2, which corresponds to the normal covering of the wheel 12 by the mudguard 24, the inner generatrices of the free ends of the terminal portions of the spring 25 are elastically tightened against the two pins 27 and 28.

In particular, for ensuring the contact between said ends and said pins 27 and 28, also in the presence of manufacturing inaccuracies, and therefore to avoid inconvenient mutual movements and flapping, the mentioned pins 27 and 28 have a non-circular cross section.

In the case shown, every single pin 27 and 28 is equipped with two diametrically-opposed, longitudinal flat portions, which in combination with said adjusting and locking nuts 270 and 280 ensure said contact between the pins and the spring (see FIG. 2) in said neutral configuration.

As is clearly illustrated, from the opposite longitudinal sides of the bracket 21, there derives the two shaped descending walls 29 which converge in a curved descending skirt 30 placed to enclose the spring 25 part opposite the bracket 21 (see FIGS. 1-3).

Moreover, each wall 29 has a threaded through hole 31 (see FIG. 1), where a counter point 33 is screwed and therein locked by an adjusting and locking nut 32. Opposite every single point 33 is a respective stop body 34 (FIG. 2), which is placed on the axle 10 (FIG. 4).

The above described support 1 substantially functions as follows.

When it is in rest or neutral configuration, the two elements 2 and 3 are mutually positioned as shown in FIGS. 1 and 2, with the mudguard 24 which is found in the normal covering position of the wheel 12, or rather it is oriented in the movement direction of the latter.

For the sake of clarity, it shall now be assumed that the maximum steering angle of the wheel 12 is, for example, $\alpha$, and that the limit oscillation angle of the mudguard, or rather that over which the mudguard would interfere with the side of the tractor, is for example $\beta < \alpha$.

When the tractor moves straight ahead or turns to the right or left, subtending steering angles less than $\beta$, the support 1 keeps said neutral configuration and overall follows the movements of the hub 11.

When the steering angle reaches and exceeds the said limit angle $\beta$, then the corresponding point 33 is supported against the respective stop body 34.

With this, the element 3 (therefore also the mudguard 24) is temporarily held, while the element 2 continues to rotate, up to max $\alpha$, and the spring 25 is further loaded by the mutual movement of the pins 27 and 28. Then, when the steering angle diminishes and returns within said limit value $\beta$, the wheel 12 and the mudguard 24 are realigned.

In FIG. 2, with thin dashed lines, a position assumed by the element 3 is shown with respect to the element 2 during a steering of the left wheel 12 to the right, and subtending an angle greater than said limit value $\beta$.

The invention claimed is:

1. Mudguard support for self-propelled operating machinery mounted on wheels, comprising a first element (2) intended to be fixed on the hub (11) of a steered wheel of the machinery, and a second element (3) which is articulated to the preceding along a substantially vertical axis (4), and is set to support the mudguard of said wheel, where between said first (2) and second (3) elements a repositioning system is interposed adapted to constantly force the mentioned elements towards a neutral configuration wherein the mudguard is found in the normal covering position of the wheel, and where a counter means is foreseen adapted to hold said second element at the time of particularly sharp turns in the direction wherein the position plane of the wheel diverges from the axis of the machinery in the movement direction, characterised in that it comprises a further counter means adapted to hold said second element at the time of particularly sharp turns in the direction wherein the position plane of the wheel converges towards the axis of the machinery in the movement direction, said repositioning system comprising an elastic member (25) which is structured and connected to said first and second elements so to hold the second element in a central position when the wheel does not exceed a specific steering angle.

2. Support according to claim 1, characterised in that said elastic member is a cylindrical torsion spring having its own axis parallel to the axis of mutual articulation between said first and second elements.

3. Support according to claim 2, characterised in that the axis of said torsion spring is coaxial with said mutual articulation axis between said first and second elements.

4. Support according to claim 3, characterised in that said torsion spring is inserted on a bush associated with the second element, and set for pivoting the first element.

5. Support according to claim 4, characterised in that said pivoting is carried out by a pivot fixed to the first element, and adapted to receive said bush with the interposition of rolling bearings.

6. Support according to claim 5, characterised in that said rolling bearings are conical bearings.

7. Support according to claim 4, characterised in that the end of the bush placed opposite the element which bears the pivot is equipped with a seal gasket, and its opposite end is closed by a cap.

8. Support according to claim 2, characterised in that the terminal portions of said spring are generally rectilinear and substantially parallel, and make available a seat where a first pin borne by the first element and a second pin fixed to the second element are received, wherewith said second element in said central position said terminal portions elastically find support on either side of said pins.

9. Support according to claim 8, characterised in that said pins have a non-circular cross section, and are each associated with the respective element by means of threaded adjustment means of their angular position.

10. Support according to claim 1, characterised in that along the periphery of the second element there is a protection which extends towards the first element, to enclose said torsion spring.

11. Support according to claim 10, characterised in that said peripheral protection is provided with two opposite, identical end oscillation points of adjustable length, each of which corresponding with a respect stop body on a fixed part of the machinery such as the axle of the wheel hub.

12. Support according to claim 1, characterised in that said articulation axis between said first and second elements coincides with the oscillation and steering axis of said hub.

* * * * *